`US009261355B2`

(12) United States Patent
Bertolotti

(10) Patent No.: US 9,261,355 B2
(45) Date of Patent: Feb. 16, 2016

(54) DEVICE FOR OPTICALLY MEASURING THE CURVATURE OF A ROTOR BLADE OF A WIND POWER PLANT

(75) Inventor: Fabio Bertolotti, Bad Bentheim (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 449 days.

(21) Appl. No.: 13/805,879

(22) PCT Filed: Apr. 28, 2011

(86) PCT No.: PCT/EP2011/056807
§ 371 (c)(1),
(2), (4) Date: Dec. 20, 2012

(87) PCT Pub. No.: WO2012/004020
PCT Pub. Date: Jan. 12, 2012

(65) Prior Publication Data
US 2013/0093879 A1    Apr. 18, 2013

(30) Foreign Application Priority Data

Jul. 5, 2010    (DE) .......................... 10 2010 017 749

(51) Int. Cl.
| | |
|---|---|
| G01B 11/24 | (2006.01) |
| F03D 1/06 | (2006.01) |
| G01M 5/00 | (2006.01) |
| G01M 11/08 | (2006.01) |
| F03D 11/00 | (2006.01) |

(52) U.S. Cl.
CPC ...... *G01B 11/24* (2013.01); *F03D 1/06* (2013.01); *F03D 11/0091* (2013.01); *G01M 5/0016* (2013.01); *G01M 5/0041* (2013.01); *G01M 5/0091* (2013.01); *G01M 11/081* (2013.01); *F05B 2270/8041* (2013.01); *F16C 2360/31* (2013.01); *Y02E 10/721* (2013.01); *Y02E 10/722* (2013.01)

(58) Field of Classification Search
CPC ....................................................... G01B 11/24
USPC .......................................................... 348/125
See application file for complete search history.

(56) References Cited

U.S. PATENT DOCUMENTS

2011/0103933 A1*    5/2011    Olesen et al. .................. 415/118

FOREIGN PATENT DOCUMENTS

| | | |
|---|---|---|
| DE | 102004027341 A1 | 12/2005 |
| DE | 102006031487 A1 | 1/2008 |

(Continued)

OTHER PUBLICATIONS

International Search Report (in German with English translation) and Written Opinion (in German) for PCT/EP2010/056807, mailed Aug. 12, 2011; ISA/EP.

(Continued)

*Primary Examiner* — Christopher S Kelley
*Assistant Examiner* — Jonathan Messmore
(74) *Attorney, Agent, or Firm* — Harness, Dickey & Pierce, P.L.C.

(57) ABSTRACT

This disclosure relates to a device for optically measuring the curvature of a rotor blade (18) of a wind power plant (1). The rotor blade is fixed at the blade root (23) to a rotor hub (8) or a rotor (6). The device includes at least one light-emitting external marking (33) fixed to the rotor blade (18) at a distance from the blade root (23), at least one camera (27) fixed to the rotor (6) for capturing the light (35) emitted from the external marking (33). The device provides first location information as a function of the relative position of the camera (27) with respect to the external marking (33). An evaluating device (37) is coupled to the camera (27), and a position detection means detects the relative location of the camera (27) with respect to the blade root (23) and provides second location information as a function of said relative location. The evaluating device (37) determines at least one variable characterizing the curvature of the rotor blade (18) while evaluating the position information.

22 Claims, 5 Drawing Sheets

(56) References Cited

FOREIGN PATENT DOCUMENTS

| EP | 1291617 A1 | 3/2003 |
| WO | WO-2009/143848 A2 | 12/2009 |
| WO | WO-2009/143849 A2 | 12/2009 |
| WO | WO-2010/054661 A2 | 5/2010 |

OTHER PUBLICATIONS

International Preliminary Report on Patentability (Chapter I of the Patent Cooperation Treaty) for PCT/EP2011/056807, issued Jan. 8, 2013.

* cited by examiner

DEVICE FOR OPTICALLY MEASURING THE CURVATURE OF A ROTOR BLADE OF A WIND POWER PLANT

CROSS-REFERENCE TO RELATED APPLICATIONS

This application is a 371 U.S. National Stage of International Application No. PCT/EP2011/056807, filed Apr. 28, 2011, and claims priority to German Patent Application No. 10 2010 017 749.0, filed Jul. 5, 2010, the disclosures of which are herein incorporated by reference in their entirety.

FIELD

The invention relates to a device for optically measuring the bending of a rotor blade of a wind turbine, which is secured to a rotor hub of a rotor with the blade root thereof, having at least one external marking which is secured to the rotor blade with spacing from the blade root and which emits light, at least one camera which is secured to the rotor and which receives the light emitted by the external marking and which provides first position information which is dependent on the relative position of the camera with respect to the external marking, and an evaluation device which is coupled to the camera.

BACKGROUND

Owing to the increase in the length and the flexibility of rotor blades in wind turbines, the control units thereof are increasingly intended to reduce loads and oscillations of the wind turbine which occur during operation. Loads of the rotor blades are primarily caused by aerodynamic effects. However, a direct measurement of the aerodynamic loads is not possible. Since the blade bending actions and the blade loads are closely related to each other, information relating to the blade bending actions constitutes good initial information for a control system of a wind turbine which such information can reduce undesirable, cyclical blade loads which can be attributed, for example, to incorrect orientation of the rotor shaft with respect to the wind direction or to vertical or horizontal wind shears.

In document NREL/TP-500-39253, published in January 2006, a method for measuring a rotor blade bending action is described according to which an infrared camera arranged in the vicinity of the blade root having an infrared radiation source and reflector strips secured to the rotor blade are used. The reflector strips which are illuminated by means of the infrared radiation source reflect the infrared radiation back to the camera so that the blade bending can be calculated by evaluating the image taken by the camera.

WO 2010/054661 A2 discloses a method for monitoring the loading of rotor blades of a wind turbine, which comprises a gondola and a rotor hub which is rotatably supported thereon by means of a rotor shaft and to which at least one rotor blade is secured. The rotor blade comprises a reflector whose position changes in accordance with the loading of the rotor blade. A radiation source for electromagnetic radiation and a radiation receiver are arranged in the gondola, a radiation path being provided from the radiation source to the reflector and back therefrom to the radiation receiver. By means of a monitoring device, a redirection of the loaded rotor blade can be determined on the basis of a modification of the radiation received from the radiation receiver.

In the above-mentioned methods, oscillations of the wind turbine lead to a measurement error since these oscillations cause a movement of the camera. Consequently, the camera movement of a movement of the reflector image caused by a blade bending is superimposed on the photo-sensitive surface of the camera. Furthermore, a measurement error is caused by the fact that the camera is displaced owing to an irreversible deformation of the camera retention member and/or the rotor blade. An example of such a deformation is the change of an originally circular cross-section of the rotor blade close to the blade root into an oval cross-section, which can be attributed to material creep under load.

Conventional camera-based systems for measuring the blade bending at one or more locations along the rotor blade use a light source which illuminates one or more reflectors, which are arranged at predetermined positions along the blade. The light reflected by the reflectors is received by means of a digital camera which comprises a photo-sensitive surface for this purpose. By evaluating the position of the reflector images on the photo-sensitive surface, the displacement of the reflectors relative to the camera position is calculated and the blade bending is derived therefrom. In this instance, in order to maximise the measurement resolution in the camera, a lens is used with such a narrow viewing angle that a maximum displacement of the reflector image on the photo-sensitive surface is achieved when the reflector (or the reflectors) experience(s) a maximum displacement to be anticipated under blade loading. Therefore, the region of the blade root of the rotor blade is not generally located in the field of vision of the camera.

The following problems are in particular connected with conventional camera-based systems for measuring blade bending:

Owing to oscillations of the camera, the reflector image moves on the photo-sensitive surface of the camera so that the system falsely interprets and signals this movement as a bending action of the rotor blade.

The position of the camera relative to the blade root changes in an irreversible manner with increasing time, for example, owing to a deformation of the rotor blade in the region of the camera position owing to material creep (for example, oval cross-section of the blade) so that a displacement of the reflector image on the photo-sensitive surface is brought about even without blade bending. Consequently, there is produced an error in the measurement of the blade bending.

SUMMARY

Based on the above, an object of the invention is to develop a device of the type mentioned in the introduction in such a manner that errors in determining the blade bending owing to camera vibrations and/or an irreversible displacement of the camera can be prevented or at least reduced.

This object is achieved according to the invention. The device according to the invention for optically measuring the bending of a rotor blade of a wind turbine, which is secured to a rotor hub of a rotor with the blade root thereof comprises:

at least one light-emitting external marking which is secured to the rotor blade with spacing from the blade root, at least a (first) camera which is secured to the rotor and which receives the light emitted by the external marking and which provides first position information which is dependent on the relative position of the camera with respect to the external marking, an evaluation device which is coupled to the camera,
a position detection means which detects the relative position of the camera with respect to the blade root and which provides second position information which is dependent on this position,
the evaluation device determining the bending of the rotor blade and/or at least one variable which characterises this bending by evaluating the position information, that is to say, in particular both items of position information.

Since the first position information characterises the relative position of the camera with respect to the external marking and the second position information characterises the relative position of the camera with respect to the blade root, the bending of the rotor blade and/or the at least one variable which characterises this bending can be determined independently of the position and/or the orientation of the camera. Consequently, the errors known from the prior art can be clearly reduced when determining the bending of the rotor blade (blade bending).

The evaluation device is preferably coupled to the position detection means. Furthermore, the position detection means may be provided separately from the camera or may comprise it so that, in the latter case, the camera forms part of the position detection means.

The evaluation device preferably derives the bending of the rotor blade from the at least one variable characterising the bending of the rotor blade. According to a development of the invention, the at least one variable characterising the bending of the rotor blade corresponds to the bending of the rotor blade.

According to an embodiment of the invention, there are secured to the rotor blade with spacing from the blade root a plurality of light-emitting external markings which preferably have a different spacing with respect to the blade root, the camera receiving the light emitted by the external markings and the first position information provided by the camera being dependent on the relative position of the camera with respect to the external markings. Owing to the use of a plurality of external markings, the measurement precision can in particular be increased. Furthermore, owing to the arrangement of the external markings with different spacings with respect to the blade root, a path of the blade bending along the blade axis can be determined. The first position information characterises in particular the relative position of the camera with respect to the external markings.

As the at least one variable which characterises the bending of the rotor blade, the evaluation device determines in particular the relative position of the blade root with respect to the external marking(s). In this instance, the relative position of the blade root with respect to the external marking(s) constitutes in particular position information which is independent of the position of the camera and which preferably characterises or describes the bending of the rotor blade.

The evaluation device calculates, in particular by evaluating the second position information, the relative position of the camera with respect to the blade root. Furthermore, the evaluation device, in particular by evaluating the first position information, calculates the relative position of the camera with respect to the external marking(s). Preferably, the evaluation device determines, from the relative position of the camera with respect to the blade root and from the relative position of the camera with respect to the external marking(s), the relative position of the blade root with respect to the external marking(s).

Preferably, a location of the blade root or a location in the region of the blade root forms a reference point which represents the position of the blade root. This reference point is preferably located in the blade axis of the rotor blade and/or preferably at the end of the rotor blade facing the hub. When referencing the position of the blade root, this position can consequently be replaced by the position of the reference point. It can thereby be taken into account that the blade root generally has an expansion. According to a development of the invention, the evaluation device determines, as the at least one variable which characterises the bending of the rotor blade, the relative position of the reference point with respect to the external marking(s).

The external marking(s) is/are preferably constructed as a light source or as a reflector which is illuminated by a light source. According to a development of the invention, the external marking(s) is/are each formed by the end of a light-guiding optical waveguide, such as, for example, a light-guiding optical fibre, in particular glass fibre, into which light is coupled preferably by means of one or more light sources. The light source or the light sources are, for example, formed by one or more light-emitting diodes. The reflector(s) is/are preferably constructed in a retro-reflective manner and can consequently also be referred to as retro-reflectors.

The camera is in particular adapted to the light with regard to the spectral sensitivity thereof. The light may be in the visible spectrum. Preferably, however, it is infrared light.

Preferably, the camera takes at least one image of the external marking(s) and provides this, in particular in the form of image data, as the first position information for the evaluation device. Preferably, the evaluation device determines from the image data, using at least one image evaluation method, the relative position of the camera with respect to the external marking(s).

The camera is secured to or in the rotor in particular by means of a retention member. Preferably, the camera is secured to the rotor at or in the region of the blade root by means of the retention member. For example, the camera is secured to a partition wall in the rotor blade in particular by means of the retention member. Such a partition wall serves, for example, to prevent service personnel and/or objects from falling into the rotor blade. There may be provided in the separation wall one or more through-openings, through which one or more optical signals or light beams extend which are used in connection with the device according to the invention.

According to an embodiment of the invention, the position detection means comprises at least one or more tension or expansion sensors which are secured to the retention member and by means of which a shape change of the retention member is detected. In this instance, the second position information provided by the position detection means is dependent on the detected shape change. Owing to the detection of the shape change of the retention member, the relative position of the camera with respect to the blade root can be determined.

According to an embodiment of the invention, the position detection means comprises at least one other camera which is arranged on or in the region of the blade root or in the rotor hub and by means of which a position change of the (first) camera which is secured to the rotor blade is detected. In this instance, the second position information provided by the position detection means is dependent on the relative position of the (first) camera with respect to the other camera. The relative position of the (first) camera with respect to the blade root can thereby be determined. The other camera preferably forms a portion of the position detection means. The (first) camera is in particular arranged in the field of vision of the other camera. The other camera is secured, for example, to the rotor blade, the blade bearing or the rotor hub. The other camera is preferably rigidly secured to the rotor hub, in particular to a portion of the blade bearing that is rigidly connected to the rotor hub. Consequently, using the other camera, a rotation of the (first) camera about the blade axis of the rotor blade relative to the rotor hub and/or the other camera can additionally be detected. Such a rotation occurs, for example, when the rotor blade is rotated about the blade axis thereof relative to the rotor hub (which is also referred to as "pitching"). In particular using the other camera, a rotation of the rotor blade about the blade axis thereof relative to the rotor hub can further be detected. Preferably, using the evaluation device, a rotation of the rotor blade about the blade axis thereof relative to the rotor hub is further determined.

The other camera preferably takes at least one image of the (first) camera and provides this, in particular in the form of image data, as the second position information of the evaluation device. Preferably, the evaluation device calculates, using at least one image evaluation method, the relative position of the (first) camera to the other camera from the image data. However, the other camera is preferably arranged on or in the region of the blade root or in the rotor hub. Consequently, the evaluation device calculates from the image data using at least one image evaluation method in particular the relative position of the (first) camera to the blade root.

According to an embodiment of the invention, the position detection means comprises at least one internal marking which is secured to the rotor on or in the region of the blade root and which emits light, the (first) camera or a second camera which is fixed in position relative thereto receiving the light emitted by the internal marking. In this instance, the second position information provided by the position detection means is dependent on the relative position of the (first) camera with respect to the internal marking. The relative position of the (first) camera with respect to the blade root can thereby be determined. The (first) camera or the second camera in this instance preferably forms the position detection means or a portion of the position detection means.

According to a development of the invention, the position detection means comprises a plurality of internal markings which are secured to the rotor on or in the region of the blade root and which emit light, and which are preferably positioned at different locations, the (first) camera or the second camera which is fixed in position relative thereto receiving the light emitted by the internal markings. In this instance, the second position information provided by the position detection means is dependent on the relative position of the (first) camera with respect to the internal markings. The relative position of the (first) camera with respect to the blade root can thereby be determined. The (first) camera or the second camera in this instance preferably forms the position detection means or a portion of the position detection means.

According to a first variant of the invention, the camera is arranged in a region of the rotor hub opposite the rotor blade and is secured thereto. In the first variant, the camera preferably forms a portion of the position detection means. A second camera is not absolutely necessary in this instance.

According to a second variant of the invention, there is provided at least one mirror which is securely connected to the camera and which is preferably arranged in the field of vision thereof and by means of which the light emitted by the internal marking(s) is reflected in the direction towards the camera. According to a development of the second variant, there are provided a plurality of mirrors which are connected to the camera and which are preferably arranged in the field of vision thereof and by means of which the light emitted by the internal marking(s) is reflected in the direction towards the camera. In the second variant and/or the development thereof, the camera preferably forms a portion of the position detection means. A second camera is not absolutely necessary in this instance.

According to a third variant of the invention, the second camera is provided, the cameras in particular being arranged in close spatial proximity to each other. The cameras are preferably joined together to form a structural unit. In particular, the second camera is connected to the evaluation device.

The first, the second and/or the third variant may also be combined with each other.

The internal marking(s) is/are preferably each constructed as a light source or as a reflector which is illuminated by a light source. According to a development of the invention, the internal marking(s) is/are each formed by the end of a light-guiding optical waveguide, such as, for example, a light-guiding optical fibre, in particular a glass fibre, into which light is coupled, preferably by means of one or more light sources. The light source or light sources is/are formed, for example, by one or more light-emitting diodes. The reflector(s) is/are preferably constructed in a retro-reflecting manner and can consequently also be referred to as retro-reflectors.

Preferably, the (first) camera or the second camera takes at least one image of the internal marking(s) and provides this in particular in the form of image data as the second position information for the evaluation device. Preferably, the evaluation device, using at least one image evaluation method, calculates the relative position of the camera or the second camera with respect to the internal marking(s) from the image data. Since the two cameras are fixed in position relative to each other, using the evaluation device it is possible to derive from the calculated relative position of the second camera with respect to the internal marking(s) the relative position of the camera with respect to the internal marking(s). If the second camera is provided, the image obtained by means of the second camera of the internal marking(s) is preferably a different image from the image which is obtained by means of the camera of the external marking(s). Alternatively, the image obtained by means of the camera of the internal marking(s) and of the external marking(s) is preferably a common image if only one camera is used.

According to an embodiment of the invention, the rotor blade comprises a hollow space in which the external marking(s) is/are arranged. The camera is also preferably arranged in the hollow space. Alternatively, the camera may be arranged in the rotor hub. The other or second camera is preferably arranged in the hollow space. Alternatively, the other or second camera may also be arranged in the rotor hub. Preferably, the internal marking(s) is/are arranged in the hollow space.

The internal marking(s) is/are preferably secured to the rotor blade, to the blade bearing or to the rotor hub. According to a development of the invention, the internal marking(s) is/are rigidly secured to the rotor hub, in particular to a portion of the blade bearing rigidly connected to the rotor hub. Consequently, using the (first) camera or the second camera, a rotation of the (first) camera and/or the second camera about the blade axis of the rotor blade relative to the rotor hub and/or the internal marking(s) can additionally be detected. Such a rotation occurs, for example, when the rotor blade is rotated about the blade axis thereof relative to the rotor hub. In particular, using the (first) camera or the second camera, a rotation of the rotor blade about the blade axis thereof relative to the rotor blade can additionally be detected. Preferably, using the evaluation device, a rotation of the rotor blade about the blade axis thereof relative to the rotor hub is additionally determined.

The invention further relates to a wind turbine having
- a rotor which can be rotated about a rotor shaft by means of wind and which comprises a rotor hub and at least one rotor blade which is secured to the rotor hub and which extends away therefrom in the direction of a blade axis which extends transversely or substantially transversely relative to the rotor shaft,
- at least one electrical generator which is mechanically coupled to the rotor and which can be driven thereby, and
- a device according to the invention for optically measuring the bending of the rotor blade.

The wind turbine according to the invention may be developed in accordance with all the embodiments which have been explained in connection with the device according to the invention.

The invention also relates to a method for optically measuring the bending of the rotor blade of a wind turbine by means of a device according to the invention.

The invention further relates to the use of a device according to the invention for optically measuring the bending of the rotor blade of a wind turbine.

Preferably, the blade bending is determined in the following manner:
- in a first step, the relative position of the camera with respect to the blade root is calculated by evaluating the second position information;
- in a second step, the relative position of the camera with respect to the external marking(s) is calculated by evaluating the first position information;
- in a third step, the relative position of the blade root with respect to the external marking(s) is determined from the positions calculated in the first step and in the second step.

The above-mentioned steps are preferably carried out by means of the evaluation device.

BRIEF DESCRIPTION OF DRAWINGS

The invention is described below with reference to preferred embodiments and the drawings, in which.

DETAILED DESCRIPTION

Figure 1:
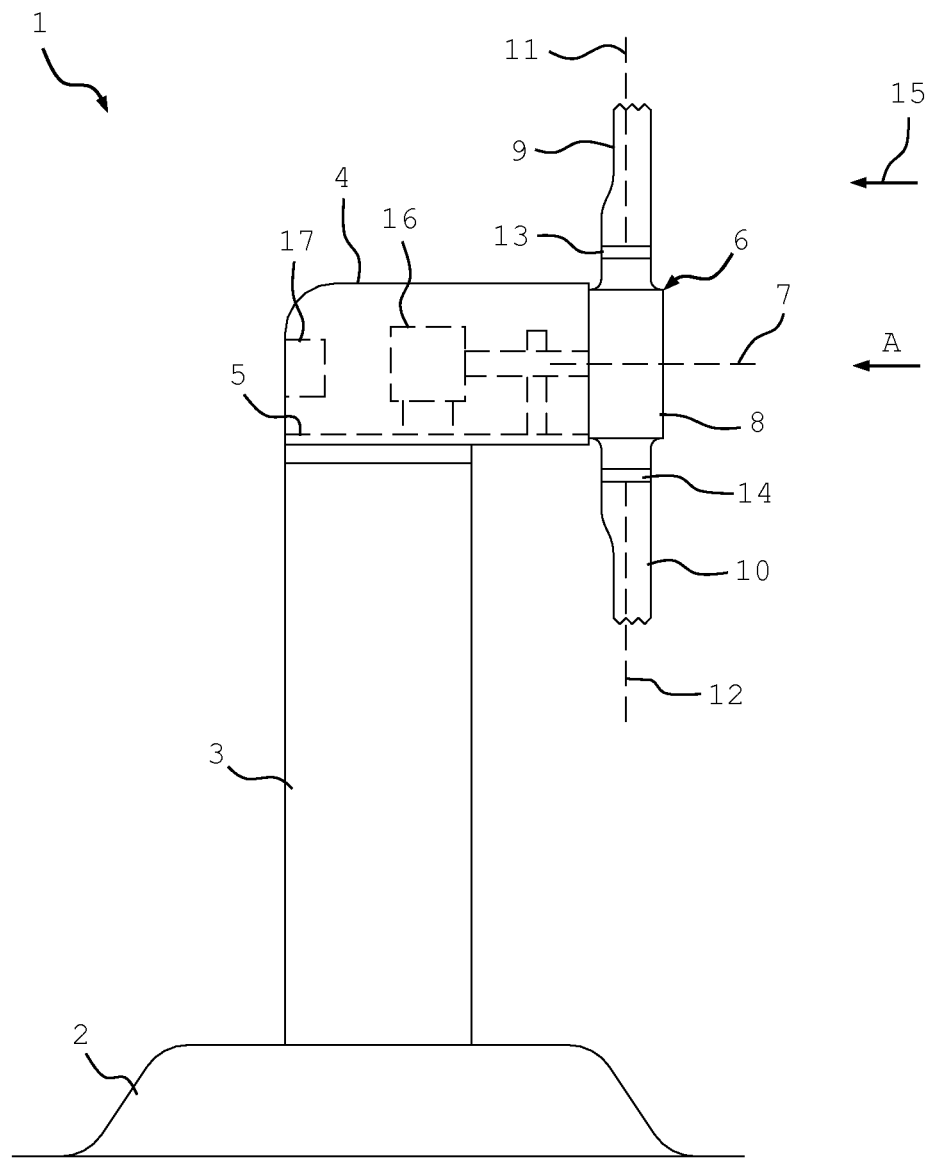
FIG. 1 is a schematic view of a wind turbine.

In FIG. 1, a wind turbine 1 can be seen. The wind turbine 1 has a tower 3 which stands on a base 2 being connected to a machine housing 4 at the end thereof facing away from the base 2. The machine housing 4 comprises a machine carrier 5, on which a rotor 6 is rotatably supported about a rotor shaft 7 which has a rotor hub 8 and rotor blades 9 and 10 which are connected thereto and which are each rotatable about the blade axis 11 or 12 thereof relative to the rotor hub 8. Each of the rotor blades 9 and 10 is mechanically coupled to a blade angle adjustment drive 13 or 14, by means of which the respective rotor blade can be rotated about the associated blade axis. The rotor 6 is mechanically coupled to an electrical generator 16 which is arranged in the machine housing 4 and which is secured to the machine carrier 5. The rotor 6 is rotated about the rotor shaft 7 thereof by means of wind 15, the rotation energy of the rotor 6 largely being converted into electrical energy by means of the generator 16. For controlled operation of the wind turbine 1, there is provided a wind turbine control system 17 by means of which the blade angle adjustment drives are controlled inter alia.

Figure 2:
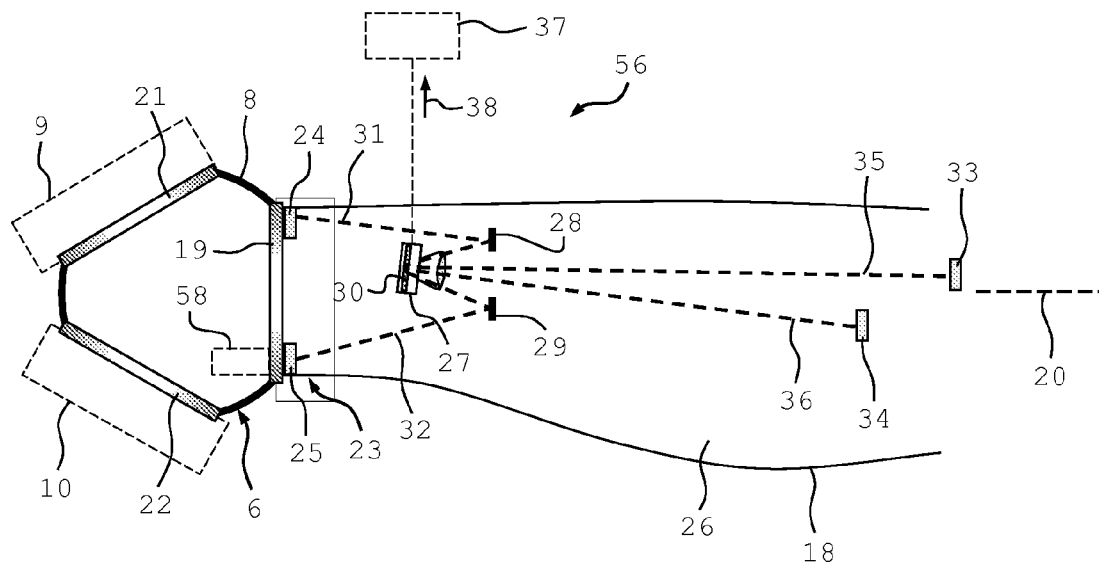
FIG. 2 is a schematic and partial illustration of the rotor which can be seen in FIG. 1 and which has a device according to a first embodiment of the invention.

FIG. 2 is a schematic and partial illustration of the rotor 6 when viewed from direction A in FIG. 1. This shows a third rotor blade 18 being rotatably supported on the rotor hub 8 about the blade axis 20 thereof by means of a blade bearing 19 (in FIG. 1, the rotor blade 18 is concealed by the rotor hub 8). In the same manner as the rotor blades 9 and 10, the rotor blade 18 is also mechanically coupled to a schematically indicated blade angle adjustment drive 58 and can be rotated thereby about the blade axis 20. The blade bearings 21 and 22 for the rotor blades 9 and 10 are also illustrated.

FIG. 2 further shows a device (measurement device) 56 according to the invention which is completely or at least partially integrated in the rotor 6 according to a first embodiment which is explained below. The end of the rotor blade 18 that is secured to the blade bearing 19 is referred to as a blade root 23, two light-emitting internal markings 24 and 25 being arranged in the region of the blade root 23 and being secured to the rotor blade 18. Alternatively, the internal markings 24 and 25 may also be secured to the blade bearing 19. With spacing from the blade root 23, a camera 27 is arranged in a hollow space 26 of the rotor blade 18 and secured to the rotor blade 18. There are securely connected to the camera 27 two mirrors 28 and 29 which reflect the light emitted by the internal markings 24 and 25 onto a photo-sensitive surface 30 of the camera 27. The beam path of the light emitted by the internal marking 24 is designated 31 and the beam path of the light emitted by the internal marking 25 is designated 32.

With spacing from the blade root 23 and the camera 27, two light-emitting external markings 33 and 34 are arranged in the hollow space 26 and secured to the rotor blade 18. The light emitted by the external markings 33 and 34 strikes the photo-sensitive surface 30 of the camera 27, the beam path of the light emitted by the external marking 33 is designated 35 and the beam path of the light emitted by the external marking 34 is designated 36.

The camera 27 is electrically connected to a schematically illustrated evaluation device 37, which is secured in the rotor blade 18, in the rotor hub 8 or to another suitable location of the wind turbine 1. For example, the evaluation device 37 may also be formed by the wind turbine control system 17. The image 45 taken by the camera 27 (see FIG. 8) is supplied to the evaluation device 37 in the form of electronic image data 38, the image data 38 comprising first position information which is dependent on the relative position of the camera 27 with respect to the external markings 33 and 34 and second position information which is dependent on the relative position of the camera 27 with respect to the internal markings 24 and 25.

The evaluation device 37 calculates, using at least one image evaluation method, the relative position of the camera 27 with respect to the blade root 23 and the relative position of the camera 27 with respect to the external markings 33 and 34. From the calculated positions, the evaluation device 37 then determines the relative position of the blade root 23 with respect to the external markings 33 and 34, this relative position characterising the bending of the rotor blade 18.

Figure 3:
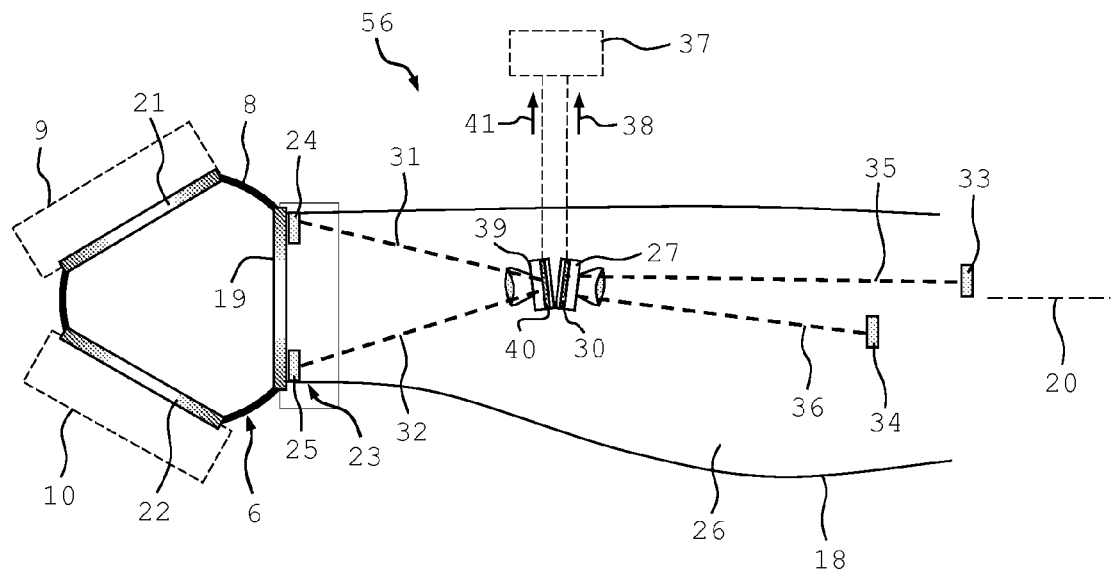
FIG. 3 is a schematic and partial illustration of the rotor having a device according to a second embodiment of the invention.

In FIG. 3, a schematic and partial illustration of the rotor 6 with a measurement device 56 according to a second embodiment of the invention can be seen, features which are similar or identical to the first embodiment being given the same reference numerals as in the first embodiment. In addition to the camera 27, there is provided in the hollow space 26 a camera 39 having a photo-sensitive surface 40 which the light emitted by the internal markings 24 and 25 strikes. The fields of vision of the cameras extend in this instance in particular in or substantially in mutually opposing directions. Each of the cameras 27 and 39 is electrically connected to the evaluation device 37 and transmits electronic image data 38 or 41 thereto. The image data 38 of the camera 27 comprise first position information which is dependent on the relative position of the camera 27 to the external markings 33 and 34, the image data 41 supplied by the camera 39 comprising second position information which is dependent on the relative position of the camera 39 with respect to the blade root 23. The cameras 27 and 39 are fixedly arranged relative to each other and form a compact structural unit.

From the image data 41, the evaluation device 37 calculates, using at least one image evaluation method, the relative position of the camera 39 with respect to the blade root 23. Since the two cameras are fixed in position relative to each other, this position also characterises the relative position of the camera 27 with respect to the blade root 23 so that the relative position of the camera 27 with respect to the blade root 23 is calculated by means of the evaluation device 37. Furthermore, by means of the evaluation device 37, using at least one image evaluation method, the relative position of the camera 27 with respect to the external markings 33 and 34 is calculated from the image data 38. Subsequently, the evaluation device 37 determines from the calculated positions the relative position of the blade root 23 with respect to the external markings 33 and 34, this relative position characterising the bending of the rotor blade 18. According to the second embodiment, no mirrors are consequently required.

Figure 4:
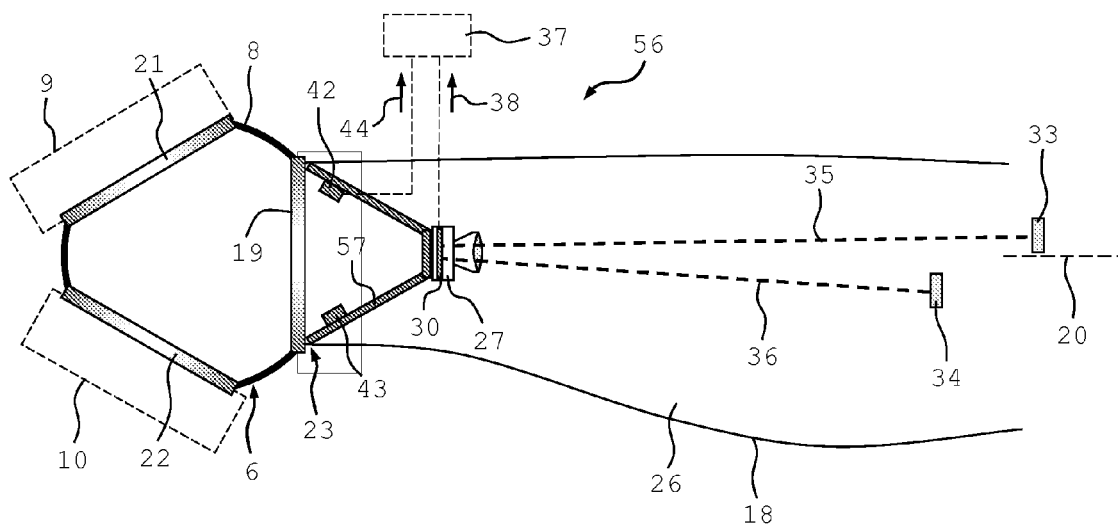
FIG. 4 is a schematic and partial illustration of the rotor having a device according to a third embodiment of the invention.

In FIG. 4, a schematic and partial illustration of the rotor 6 having a measuring device 56 according to a third embodiment of the invention can be seen, features which are similar or identical to the previous embodiments being given the same reference numerals as in the previous embodiments. The third embodiment is a modification of the second embodiment. In place of the internal markings 24 and 25 and the second camera 39, tension or expansion sensors 42 and 43 are arranged on a retention member 57 by means of which the camera 27 is secured to the blade root 23 or to the blade bearing 19. Using the sensors 42 and 43, a mechanical deformation of the retention member 57 can be detected so that the sensors 42 and 43 which are electrically connected to the evaluation device 37 supply deformation data 44 to the evaluation device 37. The image data 38 of the camera 27 comprise first position information which is dependent on the relative position of the camera 27 with respect to the external markings 33 and 34, the deformation data 44 provided by the sensors 42 and 43 comprising second position information which is dependent on the relative position of the camera 27 with respect to the blade root 23.

From the deformation data 44, the evaluation device 37 calculates the relative position of the camera 27 with respect to the blade root 23. Using at least one image evaluation method, the evaluation device 37 calculates from the image data 38 the relative position of the camera 27 with respect to the external markings 33 and 34. From the calculated relative positions, the evaluation device 37 then determines the relative position of the blade root 23 with respect to the external markings 33 and 34, this relative position characterising the bending of the rotor blade 18.

Figure 5:
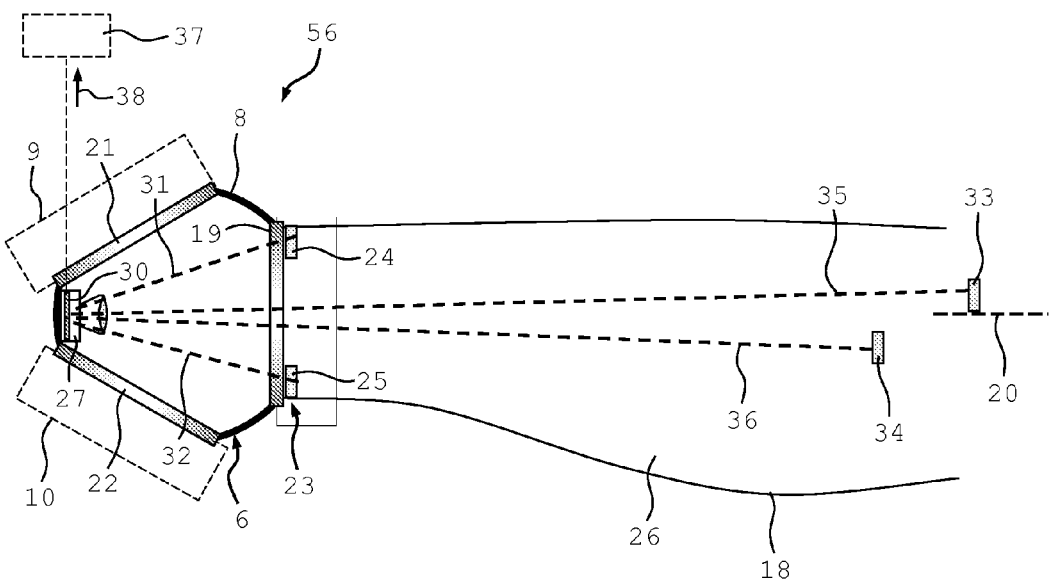
FIG. 5 is a schematic and partial illustration of the rotor having a device according to a fourth embodiment of the invention.

In FIG. 5, a schematic and partial illustration of the rotor 6 with a measuring device 56 can be seen according to a fourth embodiment of the invention, features which are similar or identical to the previous embodiments being given the same reference numerals as in the previous embodiments. The fourth embodiment forms a modification of the first embodiment. The camera 27 is arranged at a side of the rotor hub 8 opposite the rotor blade 18 and is secured thereto. The light emitted by the internal markings 24 and 25 strikes the photo-sensitive face 30 of the camera 27 directly so that no mirrors are required. In order to further describe the fourth embodiment, reference is made to the description of the first embodiment.

Figure 6:
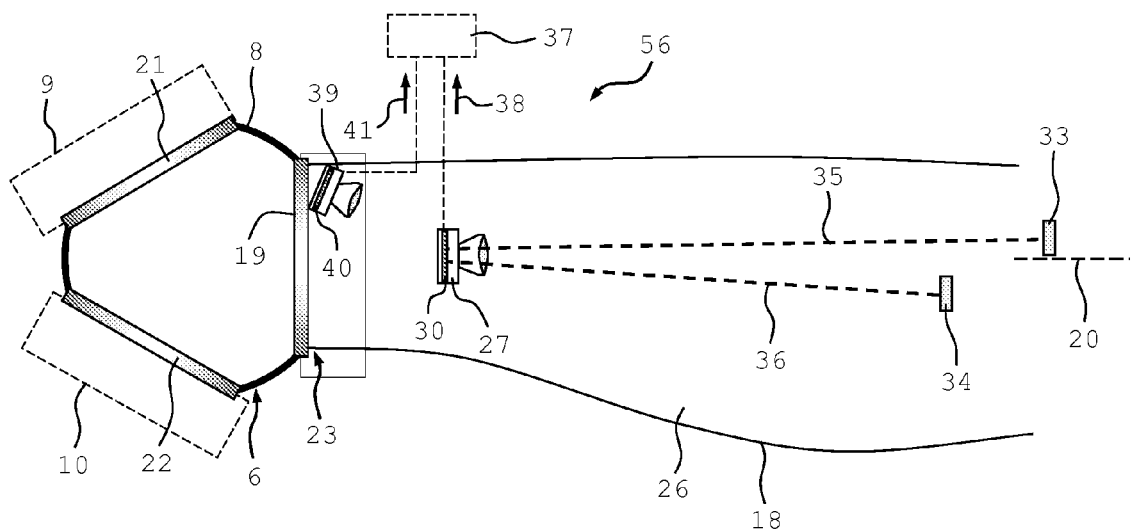
FIG. 6 is a schematic and partial illustration of the rotor having a device according to a fifth embodiment of the invention.

In FIG. 6, a schematic and partial illustration of the rotor 6 with a measuring device 56 according to a fifth embodiment of the invention can be seen, features which are similar or identical to the previous embodiments being given the same reference numerals as in the previous embodiments. In addition to the camera 27, there is provided a camera 39 having a photo-sensitive surface 40 which is secured to the rotor blade 18 or to the blade bearing 19 in the region of the blade root 23. In this instance, the camera 27 is arranged in the field of vision of the camera 39. Each of the cameras 27 and 39 is electrically connected to the evaluation device 37 and transmits electronic image data 38 or 41 thereto. In this instance, the image data 38 of the camera 27 comprise first position information which is dependent on the relative position of the camera 27 with respect to the external markings 33 and 34. The image data 41 supplied by the camera 39 comprises second position information which is dependent on the relative position of the camera 39 with respect to the camera 27. The camera 39 is preferably fixed in position relative to the blade root 23.

From the image data 41, the evaluation device 37 calculates the relative position of the camera 39 with respect to the camera 27 using at least one image evaluation method. Since the camera 39 is arranged in the region of the blade root 23, this position also characterises the relative position of the camera 27 with respect to the blade root 23 so that the relative position of the camera 27 with respect to the blade root 23 is calculated by means of the evaluation device 37. Furthermore, by means of the evaluation device 37, using at least one image evaluation method, the relative position of the camera 27 with respect to the external markings 33 and 34 is calculated from the image data. Subsequently, the evaluation device 37 determines from the calculated positions the relative position of the blade root 23 with respect to the external markings 33 and 34. This relative position characterizes the bending of the rotor blade 18. According to the fifth embodiment, no mirrors are consequently required.

Figure 7:
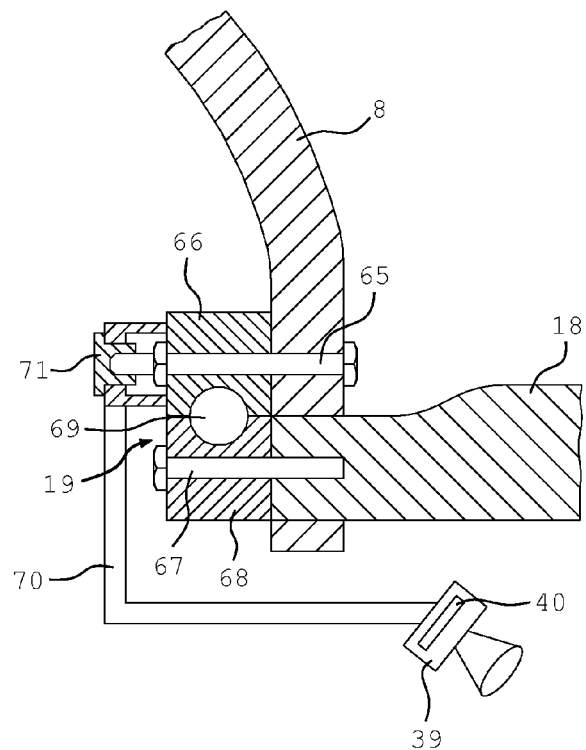
FIG. 7 is a schematic and partial illustration of the rotor having a device according to a modification of the fifth embodiment.

In FIG. 7, a schematic and partial illustration of the rotor 6 having a measuring device according to a modification of the fifth embodiment of the invention can be seen, the blade bearing 19 comprising a blade bearing portion 66 which is rigidly connected to the rotor hub 8 by means of bolts 65 and a blade bearing portion 68 which is rigidly connected to the rotor blade 18 by means of bolts 67. The blade bearing 19 is constructed in this instance as a ball bearing, the balls of the blade bearing 19 being schematically indicated and being designated 69. A retention member 70 which carries the camera 39 is placed on the illustrated bolt 65 and securely screwed thereto by means of a nut 71 so that the camera 39 is rigidly retained on the blade bearing portion 66 and consequently also retained rigidly on the rotor hub 8. Since a rotation of the rotor blade 18 about the blade axis 20 thereof also leads to a rotation of the camera 27 about the blade axis 20, a rotation of the rotor blade 18 about the blade axis 20 thereof can also be observed by means of the camera 39. The evaluation device 37 consequently preferably also calculates the torsion angle of the rotor blade 18 about the blade axis 20 relative to the rotor hub 8.

Figure 8:
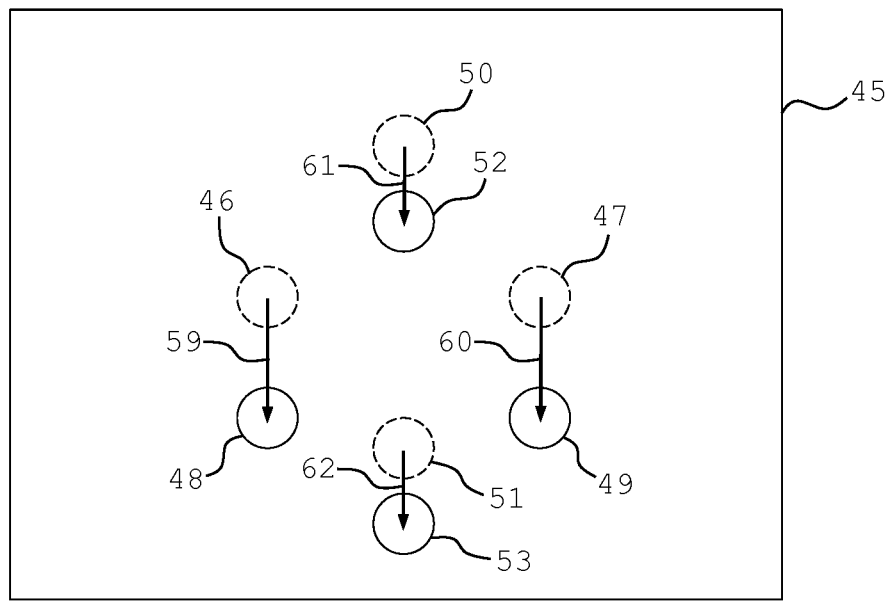
FIG. 8 is a schematic illustration of an image taken by means of the camera.

In FIG. 8, an image 45 taken by the camera 27 according to the first and/or fourth embodiment is schematically illustrated, the regions 46 and 47 representing the images of the external markings 33 and 34 in the non-bent state of the rotor blade 18. If the rotor blade 18 is bent, the images of the external markings in the image 45 are displaced, which is indicated by arrows 59 and 60. In this instance, the regions 48 and 49 characterise the images of the external markings 33 and 34 in the bent state of the rotor blade 18. The position of the images of the external markings in the image 45 consequently represents the first position information. Since the position of the regions 46 and 47 in the image 45 is known, the displacement of the regions 48 and 49 with respect to the regions 46 and 47 can also be determined by means of the evaluation device 37.

The regions 50 and 51 of the image 45 represent the images of the internal markings 24 and 25 in an original position of the camera 27. If the camera 27 is displaced relative to the blade root 23, the images of the internal markings are displaced in the image 45 which is indicated by arrows 61 and 62. In this instance, the regions 52 and 53 characterise the images of the internal markings 24 and 25 after the displacement of the camera 27. The position of the images of the internal markings in the image 45 consequently represents the second position information. Since the position of the regions 50 and 51 in the image 45 is known, the displacement of the regions 52 and 53 with respect to the regions 50 and 51 can also be determined by means of the evaluation device 37.

Figure 9:
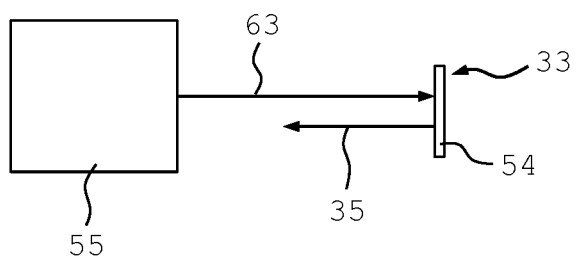
FIG. 9 shows a light source and a reflector of a device according to a variant of the embodiments.

In the previous embodiments, the markings 33 and 34 and optionally the markings 24 and 25 according to a first variant of the invention are preferably each formed by a light source. According to a second variant of the invention, at least one, a plurality or all of the markings is/are formed by means of reflectors 54 which are illuminated by means of one or more light sources 55, which can be seen schematically in FIG. 9, which shows the marking 33 in the form of a reflector 54. The light emitted by the light source 55 is designated 63.

Figure 10:
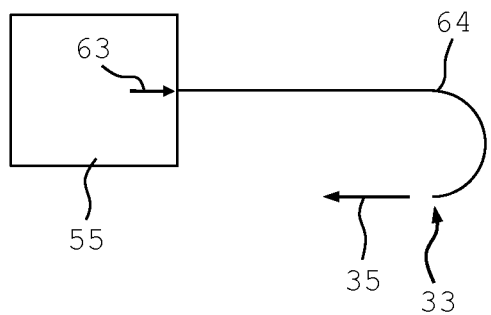
FIG. 10 shows a light source and an optical waveguide of a device according to another variant of the embodiments.

According to a third variant of the invention, at least one, a plurality or all of the markings is/are formed by means of optical waveguides 64 in which by means of one or more light sources 55 light 63 is coupled, which can be seen schematically in FIG. 10, which indicates the marking 33 in the form of an optical waveguide 64.

For each marking which is constructed as a reflector or an optical waveguide, a separate light source may be provided. However, it is also possible for several or all reflectors or optical waveguides to be supplied with light from the same light source. For example, for the external markings 33 and 34, a common or separate light source may be provided, respectively. Furthermore, for the internal markings 24 and 25, a common or separate light source may be provided, respectively.

The invention claimed is:

1. A device for optically measuring the bending of a rotor blade of a wind turbine secured to a rotor hub of a rotor, where the rotor blade is secured at a blade root to the rotor hub, the device comprising:
    a light-emitting external marking adapted to be secured to the rotor blade at a distance spaced from the blade root;
    a camera adapted to be secured to the rotor for receiving light emitted by the external marking and providing first position information dependent on a relative position of the camera with respect to the external marking;
    an evaluation device coupled to the camera and including a position detector which detects the relative position of the camera with respect to the blade root and provides second position information dependent on the relative position, wherein the evaluation device determines at least one variable characterizing the bending of the rotor blade by evaluating the position information; and
    wherein the camera is adapted to be secured to the rotor in a region of the blade root by a retention member, and wherein the position detector comprises a sensor secured to the retention member for detecting a shape change of the retention member, wherein the second position information provided by the position detector is dependent on the detected shape change, and wherein the sensor is selected from the group consisting of a tension sensor and an expansion sensor.

2. The device according to claim 1, wherein the at least one variable characterizing the bending of the rotor blade is independent of the position of the camera.

3. The device according to claim 1, further comprising a plurality of light-emitting external markings adapted to be secured to the rotor blade at a distance spaced from the blade root, the distance being different for each of the plurality of external markings, wherein the camera receives the light emitted by each of the plurality of the external markings, and wherein the first position information provided by the camera is dependent on the relative position of the camera with respect to the external markings.

4. The device according to claim 1, wherein the evaluation device determines the relative position of the blade root with respect to the external marking.

5. The device according to claim 1, wherein the evaluation device (i) calculates the relative position of the camera with respect to the blade root by evaluating the second position information; (ii) calculates the relative position of the camera with respect to the external marking by evaluating the first position information; and (iii) determines the relative position of the blade root with respect to the external marking from the calculated positions.

6. The device according to claim 1, wherein the external marking is selected from the group consisting of a light source, a reflector which is illuminated by a light source, and combinations thereof.

7. The device according to claim 1, wherein the camera takes an image of the external marking and provides the image to the evaluation device in the form of image data as the first position information.

8. The device according to claim 7 wherein the evaluation device determines the relative position of the camera with respect to the external marking from the image data using at least one image evaluation method.

9. The device according to claim 1, wherein the camera is adapted to be secured to the rotor blade, and wherein the position detector comprises at least one other camera having a field of vision in which the camera is located, the one other camera adapted to be arranged in a location selected from the group consisting of the region of the blade root and in the rotor hub, where the second position information provided by the position detector is dependent on the relative position of the camera with respect to the one other camera.

10. The device according to claim 9, wherein the one other camera is adapted to be rigidly connected to the rotor hub.

11. The device according to claim 1, wherein the position detector comprises at least one light-emitting internal marking adapted to be secured to the rotor in the region of the blade root, wherein at least one of the camera and a second camera adapted to be fixed in position relative thereto receives light emitted by the at least one light-emitting internal marking, and wherein the second position information provided by the position detector is dependent on the relative position of at least one of the camera and the second camera, with respect to the at least one light-emitting internal marking.

12. The device according to claim 11, wherein both of the camera and the second camera form at least a portion of the position detector.

13. The device according to claim 11, wherein the camera is adapted to be arranged in a region of the rotor hub opposite the rotor blade and secured thereto.

14. The device according claim 11, further comprising at least one mirror adapted to be securely connected to the camera and within a field of vision thereof such that the light emitted by the at least one light-emitting internal marking is reflected by the at least one mirror in a direction towards the camera.

15. The device according to claim 11, wherein the cameras are arranged in close spatial proximity to each other.

16. The device according to claim 11, wherein the at least one light-emitting internal marking is selected from the group consisting of a light source, a reflector which is illuminated by a light source and combinations thereof.

17. The device according to claim 11, wherein at least one of the camera and the second camera takes at least one image of the at least one light-emitting internal marking and provides image data as the second position information for the evaluation device.

18. The device according to claim 17, wherein the evaluation device determines the relative position of the camera with respect to the at least one light-emitting internal marking from the image data using at least one image evaluation method.

19. The device according to claim 1, wherein the external marking is adapted to be arranged in a hollow space formed in the rotor blade.

20. The device according to claim 19, wherein the camera is adapted to be arranged in a location selected from the group consisting of the hollow space and the rotor hub.

21. The device according claim 1 in combination with a wind turbine system comprising a rotor rotatably supported on rotor shaft having a rotor hub and at least one rotor blade secured to the rotor hub and extending therefrom in the direction of a blade axis, wherein the blade axis extends substantially transversely relative to the rotor shaft, and at least one electrical generator mechanically coupled to the rotor for driving engagement thereby.

22. A device for optically measuring the bending of a rotor blade of a wind turbine secured to a rotor hub of a rotor, where the rotor blade is secured at a blade root thereof to the rotor hub, the device comprising:
   an optical component forming an external marking adapted to be secured to the rotor blade at a distance spaced from the blade root;
   a retention member disposed within the blade in a vicinity of the blade root;
   a camera fixedly secured to the retention member at a location adjacent the blade root and within the rotor blade, the camera configured to optically view the external marking and to provide first position information dependent on a relative position of the camera with respect to the external marking;
   at least one sensor for sensing a deformation of the retention member caused by bending of the rotor blade, and generating second position information relating to the bending of the rotor blade, the deformation affecting a positioning of the camera relative to the blade root; and
   an evaluation device in communication with the camera and the at least one sensor, and configured to use the first and second position information to determine a variable, the variable characterizing the bending of the rotor blade.

* * * * *